Feb. 13, 1940.  J. E. FAY  2,190,150
ARC WELDING APPARATUS
Filed May 13, 1939

Inventor
JAMES EUGENE FAY
By
Samuel Selowitz
Attorney

Patented Feb. 13, 1940

2,190,150

UNITED STATES PATENT OFFICE 2,190,150

ARC WELDING APPARATUS

James Eugene Fay, Middletown, Ohio

Application May 13, 1939, Serial No. 273,559

6 Claims. (Cl. 219—8)

The present invention relates to arc welding apparatus and more particularly to a feeding arrangement for short-length electrodes which may be covered with non-conducting coating material applied to an automatically operating welding head.

It is the object of the present invention to provide a welding head applicable to automatic welding machines which is rugged and simple in construction and which presents a marked simplification over feeding arrangements for short welding electrodes over those known in the prior art.

It is a further object of the invention to provide short-length electrodes covered with a coating of electrically non-conducting fluxing material which are conditioned for feeding in the welding circuit with minimum work and least expense and without sacrificing any reliability in the feeding operation.

It is a further object of the invention to provide a welding head of comparatively few parts which mutually cooperate with each other to feed the short welding electrodes into the field of the welded metal deposit with reliability and certainty. These parts essentially consist of a magazine for holding the electrodes in aligned position for feeding to the electrode holder by the action of an electromagnet which withdraws the electrodes from the magazine and successively presses them into engagement with each other and forces them into the field of operation of feeding rolls which effectively advance the successive electrodes.

Other objects and purposes will appear from the more detailed description of the invention following hereinafter, taken in conjunction with the accompanying drawing, wherein.

Figures 1, 2, 3, 4, 5:
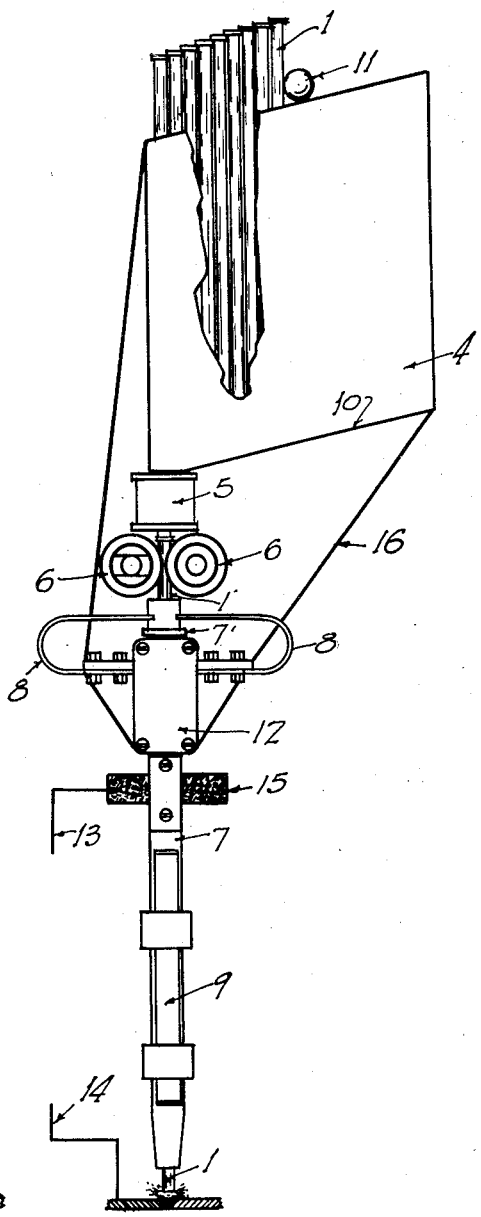
Figure 1 is a front elevation with certain parts in section of a coated welding electrode having electrical contact means forming part thereof.
Figure 2 is a front elevation with certain parts in section of a modification of Figure 1.
Figure 3 is a front elevation with certain parts in section of juxtaposed lengths of a different embodiment of the welding electrodes.
Figure 4 is a front view with certain parts in section of the welding head designed for attachment to an arc welding apparatus; and, Figure 5 is a side view of Figure 4 with certain parts broken away.

The present invention has for its purpose the feeding of short lengths of electrodes continuously in an automatic arc welding apparatus. It is the aim of the present invention to simplify the preparation and handling of the short-length electrodes which heretofore have necessitated special joining expedients either prior to or in the course of the welding operation. This preliminary conditioning was particularly necessary in the case of welding electrodes covered with ceramic or other non-conducting material which necessitated cutting away portions of the covering for the purpose of enabling electrical contact to be made with the core of the welding electrode in the course of its travel through the welding head, and joining of such covered electrodes by conductive elements in order to maintain a continuity of the electrical connection, and in some instances resort was made to both expedients. The preparation of the electrodes in accordance with the present invention for operation in the welding circuit presents a marked simplification over the arrangements known in the prior art attendant on the joining of the ends of the electrodes by metallic plugs, screw connections or cutting away parts of the electrode covering, or by welding the electrode lengths prior to the welding operation.

In Figure 1 is shown the electrode 1 covered with a non-conductive coating 3 which, as well known in the art, performs its useful function in the course of the welding operation. In order that the continuity of the electric circuit be maintained through the welding electrodes 1 despite the non-conductive coating 3, a small portion of the coating 3 is removed from the upper end of the electrode. The lateral surface of the electrode 1 may be undercut slightly or formed with a lateral groove to accommodate a toroidal metallic ring 2 which is sprung onto the electrode 1 above the coating 3 and which has an external diameter slightly larger than the outside diameter of the coating 3. The top and bottom of the electrode may be ground flat, which may also include the ring 2 as long as the diametral portion thereof overhangs the boundary of the coating 3.

Figure 2 shows a modified form of the electrode construction wherein the electrode 1 is upset to overlie the coating 3 with the end of the electrode forming a circular projection extending beyond the lateral surface of the covering.

Figure 3 shows a different embodiment of the invention wherein a metal punching or slug 2" is spot welded to the upper end of the electrode 1 whereupon both ends are ground flat. In this view are shown two of such electrodes in close contact with each other and illustrate the manner in which such are fed toward the arc through the welding head.

Figures 4 and 5 show a front and side view respectively of a welding head in which the electrodes in accordance with the present invention are used. The welding circuit is shown in part by conductors 13 and 14 which are connected to a welding current generator. The former is connected to the conductive shunts 15 completing effective contact of the conductor 13 with the electrode holder while the conductor 14 is connected to the work which is being welded. The circuit is completed through the welding electrodes which are fed continuously through the electrode holder 7. Contact between the electrode holder 7 and the electrodes is maintained at all times by means of the conductive rings or projections 2, 2' and 2" described above.

The mounting plate 16 for the welding head may be attached by bolts, screws and the like, to an automatic welding apparatus for the purpose of utilizing short-length electrodes. The magazine 4 is provided with a smooth and highly polished inclined bottom 10 in order that the electrodes 1 which are arranged vertically therein may travel by gravity to the outlet end of the magazine. This gravity feed of the electrodes in vertical alignment may be assisted by means of a heavy metallic ball 11 acting on the last electrode and guided on the incline at the top of the magazine.

An opening in the bottom 10 of the magazine 4 permits the most advanced electrode to pass downwardly therethrough. This withdrawal action is executed positively by the solenoid 5 having a central opening. The energization of the solenoid gives rise to an electromagnetic force which acts to withdraw the electrodes successively through the central opening into pressing engagement with each other and into the field of operation of the feed rollers 6 which advance the electrodes through the electrode holder 7. These feed rollers are driven by gears 6' which transmit an effective driving traction to the rollers 6 without harming the coating 3. One of the drive rolls 6 is adjustable and under spring tension in order to impart yieldability to the arrangement while exerting an effective feeding movement.

The electrode holder 7 is mounted loosely in a bracket 12 which is affixed to the mounting plate 16. This electrode holder is preferably of bipartite construction, the parts of which are yieldingly held in comparatively tight engagement by means of springs 9 so that an effective contact between the conductive projections of the electrode lengths may be realized. The electrode holder or nozzle 7 is capable of a slight movement in an upward or downward direction. The shoulder 7' at the upper end of the nozzle coacts with the bracket 12 to limit the downward movement of the former so that the feeding movements of the electrodes are not transmitted to the electrode holder. On the other hand, the springs 8 extending between the mounting bracket and the upper end of the nozzle 7 permits a slight upward movement of the latter so that upon the reversal of the driving motor to draw an arc when starting, the springs will permit a lifting of the nozzle without permitting the separation of the electrodes therein to take place.

If desired, the nozzle 7 may be water-cooled.

The cooperation between the solenoid 5, feed rolls 6 and electrode holder 7, is such that an effective continuous welding rod composed of a series of short-lengths is fed to the welding arc. In order to insure a continuous electric circuit the welding head is of greater length than the individual short-length welding electrodes.

While I have described my invention as embodied in concrete form and as operating in a specific manner for purposes of illustration, it should be understood that I do not limit my invention thereto, since various modifications will suggest themselves to those skilled in the art without departing from the spirit of my invention, the scope of which is set forth in the annexed claims.

What I claim is:

1. In an electric welding apparatus, a magazine for short welding electrodes, feeding means for said electrodes, and magnetic means between said magazine and said feeding means for withdrawing said electrodes from said magazine for introduction thereof into the field of operation of said feeding means.

2. In an electric welding apparatus, a magazine for coated welding electrodes of short-lengths, stripped at one end thereof and provided with a conductive projection thereat, feeding means for said electrodes, and electromagnetic means between said magazine and said feeding means for attracting said electrodes successively into the field of operation of said feeding means.

3. In an electric welding apparatus, a magazine for short-length coated electrodes bared at one end thereof and provided with a conductive projection thereat, feed rollers for said electrodes, and a solenoid having a central opening therein between said magazine and said feed rollers for withdrawing said electrodes from said magazine successively into the field of operation of said feed rollers.

4. In an electric welding apparatus, a magazine for short-length coated electrodes, each bared at one end thereof and provided with a conductive projection thereat, feed rollers for said electrodes, an electrode holder for receiving electrodes from said feed rollers and adapted to make electrical contact with the conductive projections thereof, and electromagnetic means between said magazine and said feed rollers for directing said electrodes successively between said feed rollers and continuously supplying said electrode holder with electrodes in abutting relation.

5. In an electric welding apparatus, a magazine for coated welding electrodes of short-lengths, each stripped at the upper end thereof and provided with a conductive projection thereat overlying the surface of the coating, feed rollers for said electrodes, an electrode holder for receiving electrodes from said feed rollers and adapted to make electrical contact with the conductive projections thereof, said holder being of greater length than the individual electrodes, and electromagnetic means between said magazine and said feed rollers for directing said electrodes successively between said feed rollers and continuously supplying said electrode holder with electrodes in abutting relation.

6. In an electric welding apparatus, a magazine for short-length coated electrodes, each bared at one end thereof and provided with a conductive projection thereat overlying the surface of the coating, feed rollers for said electrodes, a bipartite electrode holder for receiving electrodes from said feed rollers and adapted to make electrical contact with the conductive projections thereof, yielding retaining means for the parts of said holder, and a solenoid having a central opening therein between said magazine and said feed rollers for withdrawing said electrodes successively from said magazine into said feed rollers, thereby continuously to supply said electrode holder with electrodes in abutting relation.

JAMES EUGENE FAY.